(12) United States Patent
Duprat

(10) Patent No.: US 10,940,762 B2
(45) Date of Patent: Mar. 9, 2021

(54) ASSEMBLY OF A GROUND POWER SUPPLY SYSTEM AND AN ELECTRIC VEHICLE

(71) Applicant: ALSTOM TRANSPORT TECHNOLOGIES, Saint-Ouen (FR)

(72) Inventor: Patrick Duprat, Le Raincy (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 342 days.

(21) Appl. No.: 15/958,281

(22) Filed: Apr. 20, 2018

(65) Prior Publication Data
US 2018/0304752 A1    Oct. 25, 2018

(30) Foreign Application Priority Data

Apr. 25, 2017 (FR) ...................................... 1753580

(51) Int. Cl.
*B60L 5/38* (2006.01)
*B60M 1/30* (2006.01)
(Continued)

(52) U.S. Cl.
CPC ....... *B60L 5/38* (2013.01); *B60L 5/04* (2013.01); *B60L 9/00* (2013.01); *B60L 53/14* (2019.02);
(Continued)

(58) Field of Classification Search
CPC . B60M 1/08; B60M 1/30; B60M 1/36; B60M 3/04; B60M 7/00; B60L 5/39
See application file for complete search history.

(56) References Cited

U.S. PATENT DOCUMENTS

| 4,139,071 A | * | 2/1979 | Tackett | ..................... B60L 9/00 180/165 |
| 4,476,947 A | * | 10/1984 | Rynbrandt | ................ B60L 9/00 180/2.1 |

(Continued)

FOREIGN PATENT DOCUMENTS

| DE | 19935783 A1 | 2/2000 |
| FR | 3019112 A1 | 10/2015 |

(Continued)

OTHER PUBLICATIONS

Preliminary Search Report dated Dec. 12, 2017 during the prosecution of French Patent Application No. 1753580.
(Continued)

*Primary Examiner* — Jason C Smith
(74) *Attorney, Agent, or Firm* — Troutman Pepper Hamilton Sanders LLP

(57) ABSTRACT

This assembly, which includes a ground level power supply system of the type using conduction, including conductive tracks arranged on a roadway, and an electric vehicle, capturing electric energy from said tracks it moves on the roadway, is characterized in that the power supply system includes a ground level antenna, configured so as to have a constant radiation chart along a longitudinal axis of the roadway and emitting a positioning signal, and in that the electric vehicle includes an on board antenna and an on board module, connected to the on board antenna and capable of determining a lateral position of a center of the on board antenna relative to the longitudinal axis from the positioning signal captured by the on board antenna.

9 Claims, 3 Drawing Sheets

(51) Int. Cl.
*B60M 1/36* (2006.01)
*B60L 5/04* (2006.01)
*B60L 53/30* (2019.01)
*G05D 1/02* (2020.01)
*B60L 9/00* (2019.01)
*B60L 53/36* (2019.01)
*B60L 53/14* (2019.01)

(52) U.S. Cl.
CPC ............... *B60L 53/32* (2019.02); *B60L 53/36* (2019.02); *B60M 1/30* (2013.01); *B60M 1/36* (2013.01); *G05D 1/0265* (2013.01); *B60L 2260/32* (2013.01); *G05D 2201/0213* (2013.01); *Y02T 10/70* (2013.01); *Y02T 10/7072* (2013.01); *Y02T 90/12* (2013.01); *Y02T 90/14* (2013.01); *Y02T 90/16* (2013.01)

(56) References Cited

U.S. PATENT DOCUMENTS

| | | | | |
|---|---|---|---|---|
| 5,464,082 A * | 11/1995 | Young | ........................ | B60L 5/38 191/2 |
| 6,189,664 B1 * | 2/2001 | Siciliano | ................ | B60M 1/103 191/18 |
| 6,209,693 B1 * | 4/2001 | Siciliano | ................ | B60M 1/103 191/18 |
| 6,250,442 B1 * | 6/2001 | Perraud | .................... | B60M 1/08 191/1 R |
| 6,471,020 B1 * | 10/2002 | Hernandez | .............. | B60L 53/14 191/2 |
| 8,220,568 B2 * | 7/2012 | Stoicoviciu | ............ | B60K 25/08 180/2.1 |
| 8,493,024 B2 * | 7/2013 | Kissel, Jr. | .................. | B60L 5/40 320/109 |
| 8,499,910 B2 * | 8/2013 | Hubner | .................... | H02J 5/005 191/10 |
| 10,189,363 B2 * | 1/2019 | Ricci | .................... | B60L 11/1829 |
| 10,336,194 B2 * | 7/2019 | Ricci | ...................... | B60L 3/0015 |
| 10,566,734 B1 * | 2/2020 | Pabouctsidis | ....... | H01R 12/7005 |
| 10,604,020 B2 * | 3/2020 | Ricci | ........................ | B60L 53/38 |
| 10,654,363 B2 * | 5/2020 | Hourtane | ................... | B60L 5/42 |
| 2011/0094840 A1 * | 4/2011 | Sakita | ..................... | B60L 53/12 191/2 |
| 2013/0037367 A1 * | 2/2013 | Aguilar | .................. | B60M 7/003 191/22 C |
| 2014/0151175 A1 * | 6/2014 | Vietzke | .................... | E01C 9/00 191/10 |
| 2014/0319927 A1 * | 10/2014 | Cho | ........................ | H01F 27/365 307/104 |
| 2015/0224999 A1 * | 8/2015 | Duprat | ..................... | B60M 1/34 238/14.3 |
| 2015/0274034 A1 * | 10/2015 | Hourtane | .................. | B60M 7/00 191/6 |
| 2015/0274035 A1 * | 10/2015 | Hourtane | .................. | B60M 7/00 191/6 |
| 2018/0304752 A1 * | 10/2018 | Duprat | ....................... | B60L 5/04 |
| 2018/0304769 A1 * | 10/2018 | Duprat | ................... | B60M 7/003 |

FOREIGN PATENT DOCUMENTS

| | | |
|---|---|---|
| WO | 2007056804 A1 | 5/2007 |
| WO | 2017059893 A1 | 4/2017 |

OTHER PUBLICATIONS

Gotting Kg et al., "AGV Guidance Technologies," pp. 1-19; (Feb. 28, 2012), XP055434383.

* cited by examiner

US 10,940,762 B2

ASSEMBLY OF A GROUND POWER SUPPLY SYSTEM AND AN ELECTRIC VEHICLE

CROSS-REFERENCE TO RELATED APPLICATIONS

The present application claims priority from French Patent Application No. 1753580 filed Apr. 25, 2017. The entire contents of which are incorporated herein by reference.

FIELD OF THE INVENTION

The present invention relates to electric vehicles.

BACKGROUND

A general trend with vehicle builders, in particular for electric vehicles, is to turn to the market for fully autonomous vehicles, or at the very least for vehicles offering advanced driving assistance.

Furthermore, backed by its experience in the field of ground level power supply systems, of the type using conduction, for guided electric vehicles, i.e., vehicles forced to move along tracks (in particular tramways moving along railroad tracks), the applicant has developed ground level power supply systems of the type using conduction for non-guided electric vehicles. Reference may for example be made to French patent application number 14 52525.

SUMMARY

The present invention therefore aims to respond to the aforementioned trend by improving both ground level power supply systems and the electric vehicles capable of cooperating with such systems.

The invention therefore relates to an assembly made up of a ground level power supply system and an electric vehicle, the ground level power supply system being of the type using conduction and including conductive tracks arranged in a roadway and the electric vehicle being capable of capturing electric energy from said conductive tracks while said electric vehicle is moving on the roadway, characterized in that the ground level power supply system includes a ground level device including a ground level antenna buried in the roadway, configured so as to have a substantially constant radiation chart along a longitudinal axis of the roadway and capable of emitting a positioning signal, and in that the electric vehicle includes an on board device including an on board antenna and an on board module, which is connected to the on board antenna and is capable of determining a lateral position of a center of the on board antenna relative to the longitudinal axis of the roadway from the positioning signal captured by the on board antenna, the on board transceiver module being connected to an onboard computer (150) of the electric vehicle and sending said lateral position to said onboard computer (150), said on board computer using said lateral position as input data to drive the electric vehicle.

According to specific embodiments, the assembly includes one or more of the following features, considered alone or according to any technically possible combinations:

the assembly includes: a pair of power supply tracks including a so-called phase conductive track, able to be brought to a supply voltage, and a so-called neutral conductive track, for the reverse current, the neutral track traveling parallel to the phase track and the phase track being made up of a plurality of segments arranged end-to-end along the longitudinal axis of the roadway, each segment being electrically insulated from its neighbors; and a voltage source capable of delivering the supply voltage.

the electric vehicle includes a current capture device including a shoe capable of coming into sliding contact on the conductive tracks of the ground level power supply system.

the on board antenna of the on board device is mounted on the shoe.

the on board device includes a front on board antenna, mounted at the front of the electric vehicle, and a rear on board antenna, mounted at the rear of the electric vehicle, the on board module being capable of determining the lateral position of the geometric center of each of the front and rear on board antennas relative to the longitudinal axis of the roadway and sending said lateral positions to the on board computer to determine the position of the longitudinal axis of the electric vehicle relative to the longitudinal axis of the roadway.

the positioning signal is a continuous radio signal.

the electric vehicle includes an on board device for emitting a presence signal and the ground level power supply system includes a ground level device for receiving the presence signal.

the on board device is a transceiver device capable of participating both in a lateral positioning function by receiving a location signal emitted from the ground, and a function for detecting the presence of a vehicle by emitting a presence signal toward the ground.

the ground level device is a transceiver device capable of participating both in a lateral positioning function by emitting a location signal intended for on board, and a presence detection function by detecting a suitable presence signal emitted from on board.

the electric vehicle is of the driverless type, an on board computer steering the electric vehicle, or of the type with a driver, an on board computer offering driving assistance for the electric vehicle.

BRIEF DESCRIPTION OF THE DRAWINGS

The invention will be better understood upon reading the following description of one particular embodiment, provided solely as an illustration and non-limitingly, and done in reference to the appended drawings, in which.

DETAILED DESCRIPTION

Figure 1:
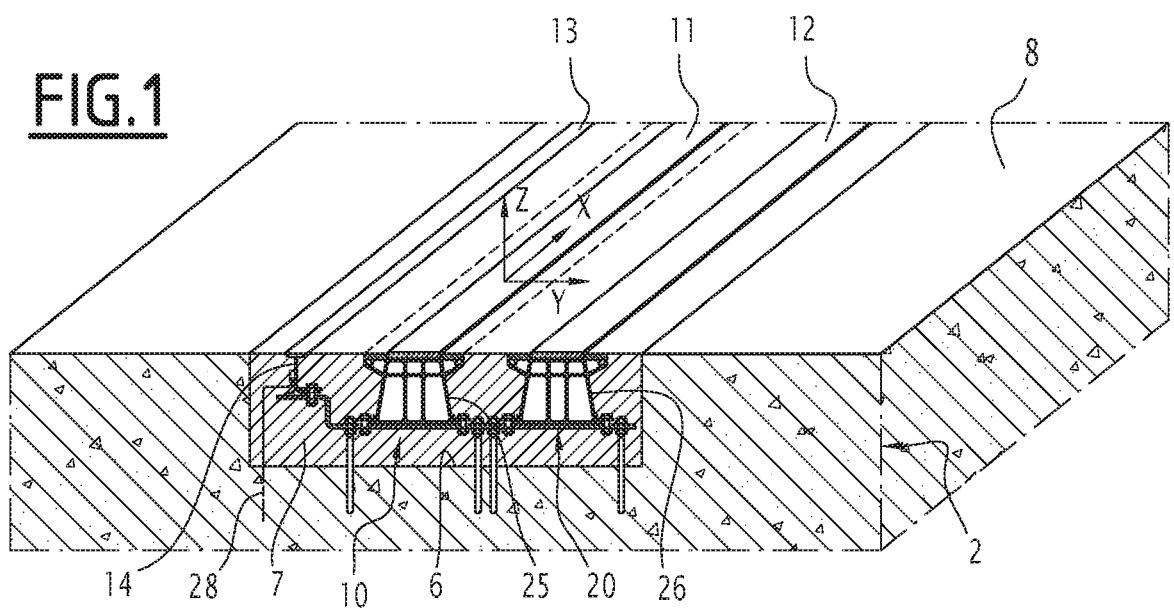
FIG. 1 is a schematic material perspective illustration of a roadway equipped with one preferred embodiment of a ground level power supply system for the equipment according to the invention.
Figure 2:
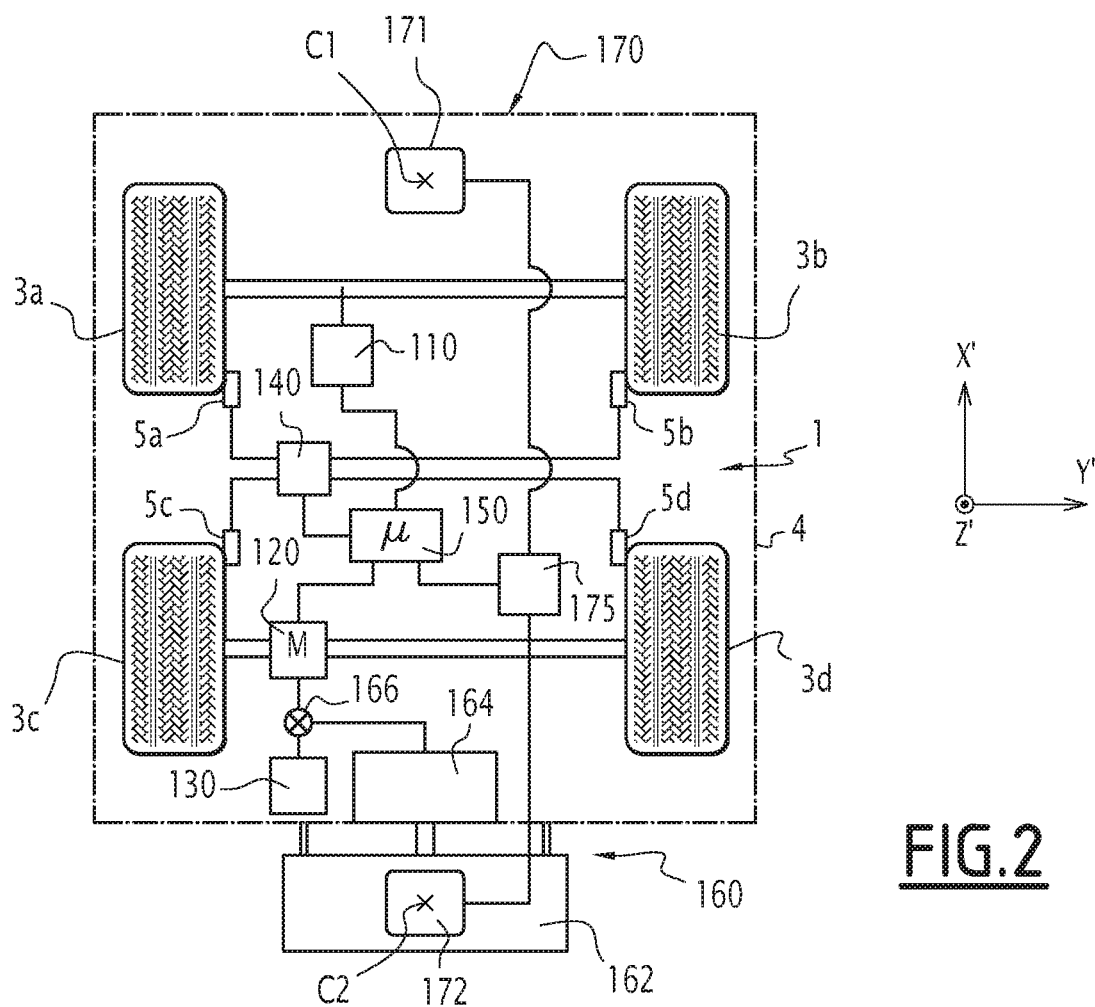
FIG. 2 is a schematic illustration in top view of one preferred embodiment of an electric vehicle of the equipment according to the invention.

In the figures, a car 1 is shown as an example of an electric vehicle, in particular a non-guided electric vehicle, traveling on a roadway 2 incorporating a ground level power supply system 10. The car 1 is preferably a driverless car, i.e., autonomous, an on board computer controlling the car, in particular for the lateral guiding on the axis of the path. Alternatively, the car 1 is a car with a driver, the on board computer offering driving assistance, in particular for the lateral guiding on the axis of the path.

The ground level power supply system 10 is of the type using conduction, i.e., placement in contact by two conductive tracks. It includes a plurality of conductive tracks located in the middle of a circulation path of the vehicles on the roadway 2.

The system 10 has, flush with the flat surface 8 of the roadway 2, a plurality of conductive tracks, in particular power supply tracks and a protection track. More specifically, the system 10 includes:
- a phase track 11, intended to be electrically connected either to an electric power source, or to the ground potential $V_{terre}$;
- a neutral track 12, intended to be electrically connected to the negative bar of the power source to provide the return of the traction current;
- a protective track 13, intended to be electrically connected to a ground potential $V_{terre}$.

The phase track 11 is made up of a plurality of segments 11.$i$ (FIG. 5), having an elongate, preferably rectangular shape, which, in the embodiment currently considered, each have a width of 10 cm and a length greater than 5 m.

The segments are positioned end-to-end to make up the phase track 11.

The segments are electrically insulated from one another.

Advantageously, the neutral track 12 is made by using segments of the same type as those used for the phase track 11. Thus, the track 12 is made up of a plurality of segments 12.$i$ (FIG. 5) having a width smaller than 10 cm and a length greater than 5 m.

The consecutive segments of the neutral track 12 are connected to one another to provide the return of the current to the power source.

The neutral track 12 runs parallel to the phase track 11, on a first side, for example the right side relative to a direction of travel thereof (corresponding to the direction X in the figures). The lateral edges of the phase track 11 and the neutral track 12, which are across from one another, are separated by a second distance of about 10 to 15 cm.

The protective track 13 is for example formed by the upper face of a profile 14 sealed in concrete 7 filling the trench 6.

For example, the profile 14 has an I-shaped section, the central core of which is positioned substantially vertically. The width of the protective track 13 is for example approximately 5 cm.

The protective track 13 is arranged parallel to the phase track 11, on a second side thereof, opposite the first side on which the neutral track 12 is located, for example on the left side relative to the direction of travel.

The lateral edges of the phase track 11 and the protective track 13, which are across from one another, are separated by a second distance of about 10 to 15 cm.

The function of the protective track 13 is to stop any leak currents coming from the phase track 11, any leak currents toward the first side being stopped by the neutral track 12.

With this particular choice of values for the lateral dimensions of the different tracks and their mutual spacing, the system 10 has a total width of approximately 45 cm.

When the phase track 11 is brought to a high potential, any leak current, for example due to the presence of a conductive water height on the roadway 2 or any other conductive material through the ground level power supply system 10, is collected by the neutral track 12 and/or by the protective track 13. The portion of the roadway 2 brought to a high potential therefore does not extend laterally past the tracks of the system 10, which makes it possible to guarantee that a pedestrian next to this vehicle when the phase track 11 is brought to a high potential will not be electrocuted.

Figure 3:
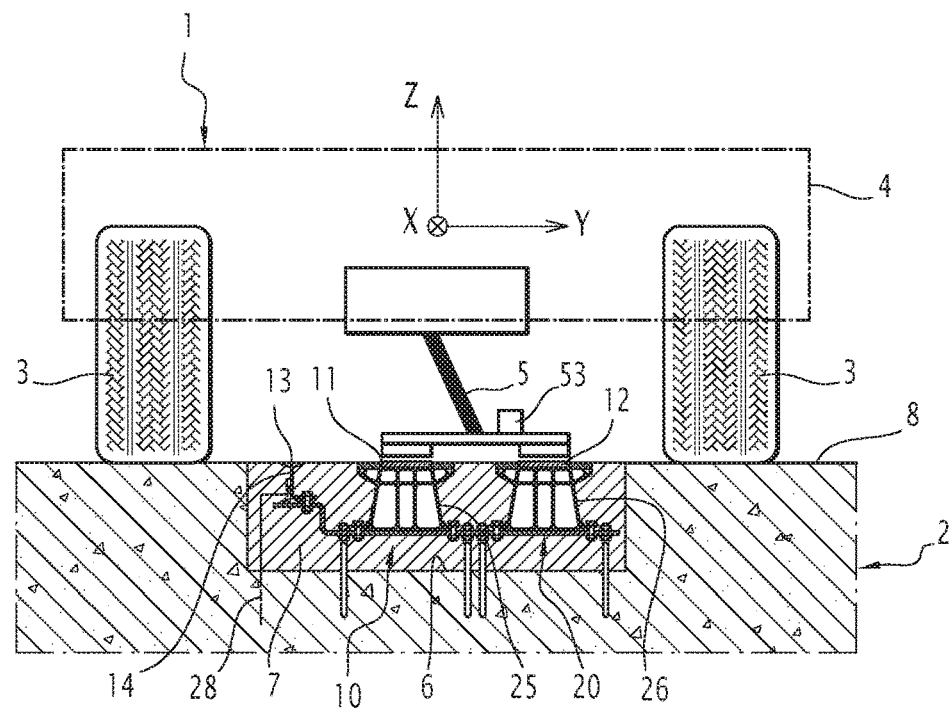
FIG. 3 is a rear view of the vehicle of FIG. 2 traveling on the roadway of FIG. 1.
Figure 4:
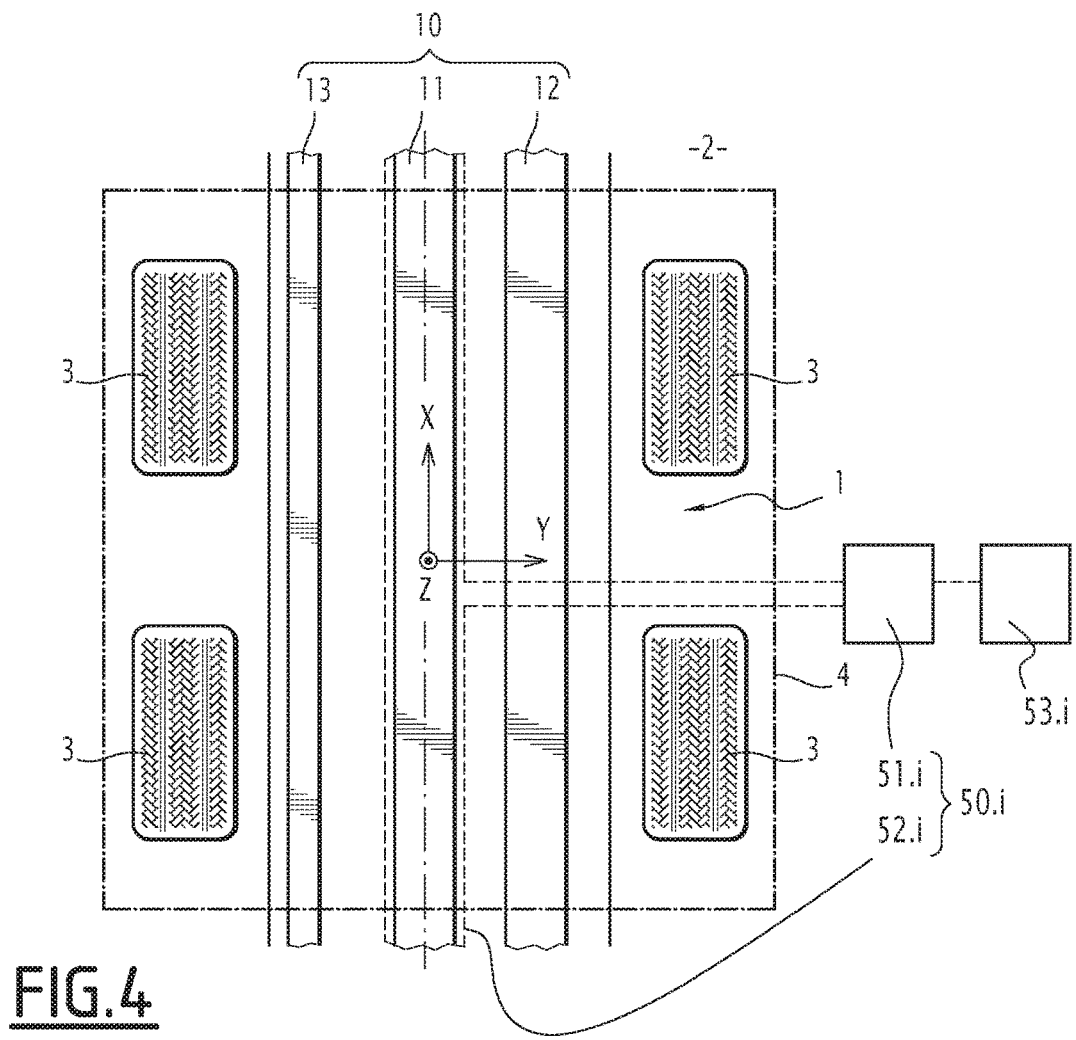
FIG. 4 is a top view of the vehicle of FIG. 2 traveling on the roadway of FIG. 1.

Furthermore, a device, shown schematically in FIG. 3 and bearing reference 34, is provided to detect the circulation of a leak current in the neutral track 12 or the protective track 13 and to trigger securing of the system.

Preferably, to facilitate the installation of the tracks of the system 10, the latter comprises a carrier assembly. It for example includes a base 20 bearing two carrier profiles 25 and 26, identical to one another, serving as an insulating carrier for the phase 11 and neutral 12 tracks. These tracks are mechanically fastened on the carrier profiles, but are electrically insulated from the latter.

The base 20 also bears the profile 14. An electric cable 28, fastened to the core of the profile 14, is designed to be buried in the roadway 2, so as to position the protective track 13 at the ground potential $V_{terre}$, and by electric continuity, the base 20.

The base 20 is provided with a plurality of connecting rods, the height of which is adjustable, which can be plugged into the bottom of the trench 6 so as to pre-position the system 10 so that the tracks are flush with the surface 8 of the roadway 2 to be produced and the median axis of the phase track coincides with the longitudinal axis of the travel path equipped with the system 10.

Then, concrete is poured so as to embed the carrier assembly. The carrier profiles 25 and 26 as well as the profile 14 are then sealed. Advantageously, the state of the upper surface of the concrete layer is worked to have an adherence adapted to the tires of the vehicles traveling on the roadway 2.

The pair of power supply tracks, made up of the phase track 11 and the neutral track 12, as well as the protective track 13, are flush with the surface 8 of the roadway 2. More specifically, the tracks 11 and 12 protrude slightly above the surface 8 of the roadway 2, for example by a height of several millimeters, in particular equal to 2 mm. The track 13 is at the surface 8 level of the roadway 2.

A trihedron XYZ is associated with the roadway 2 such that the axis X coincides with the median axis of the phase track 11, i.e., the longitudinal axis of the travel path of the vehicles on the roadway 2; the axis Z corresponds to a direction perpendicular to the surface 8 of the roadway 2; and the axis Y is orthogonal to the axis X in the axis Z, the plane XY corresponding to the flat surface 8.

Figure 5:
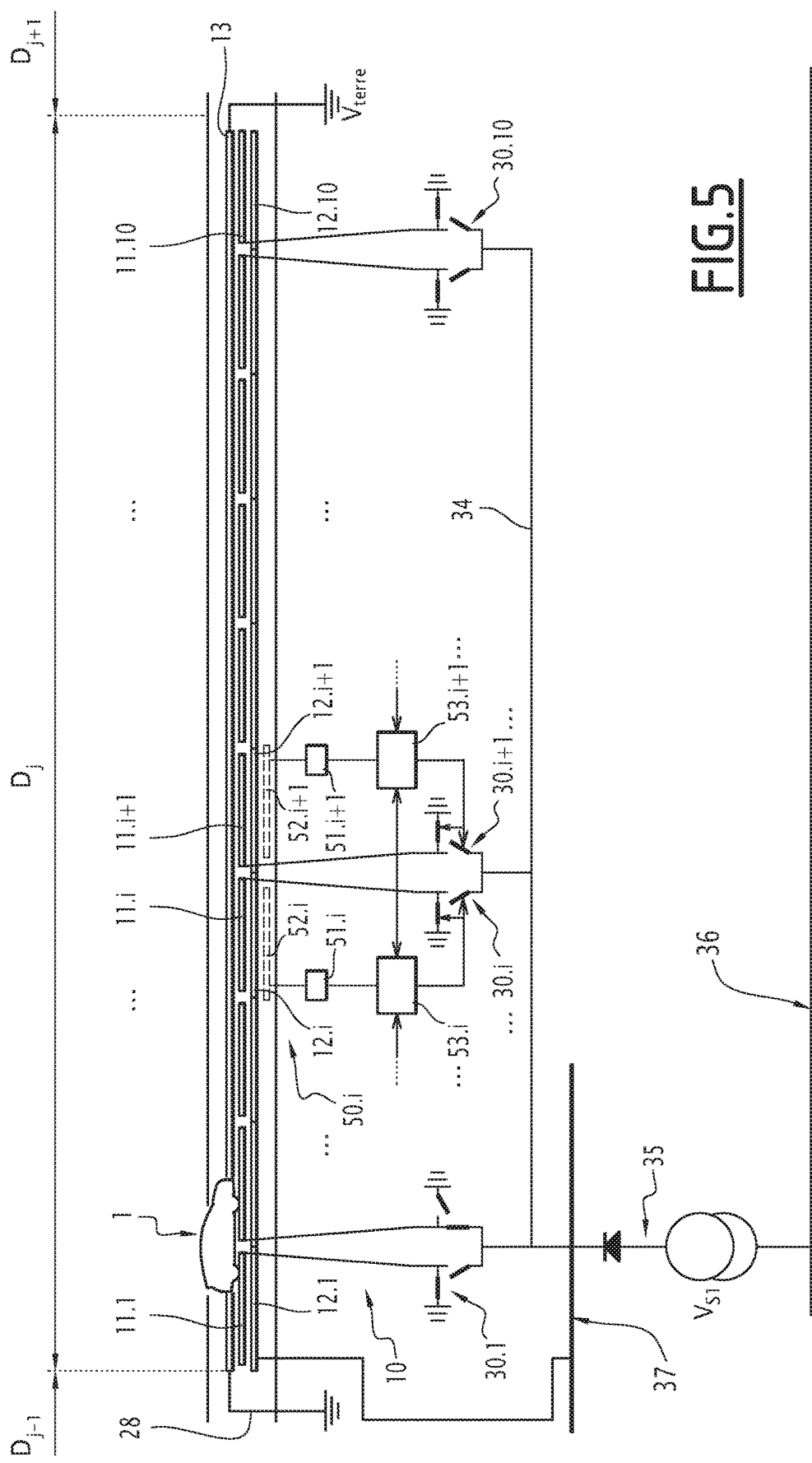
FIG. 5 is a schematic electric illustration of the ground level power supply system of FIG. 1.

An electrical diagram of the power supply system 10 is provided in FIG. 5.

The system 10 is subdivided into longitudinal sections. The section Dj is located between adjacent sections Dj−1 and Dj+1. A section Dj corresponds to a plurality of segments 11.$i$ of the phase track 11 (for example, ten in FIG. 5).

Each segment of the plurality of segments 11.$i$ of a section Dj is electrically connected, via a dedicated control switch 30.$i$, either to a ground potential or to a power supply line 34 shared by the various segments 11.$i$ of the controlled section Dj.

The power supply line 34 is connected to an electric power source 35. The source 35 is for example an electric substation able to convert a three-phase current delivered by an outside grid 36 into a direct current. The source 35 for example gathers transformation and rectification functions.

The system 10 includes, for each of the segments 11.$i$, a ground level transceiver device 50.$i$ including a transceiver module 51.$i$ connected to a ground level antenna 52.$i$.

The antenna 52.*i* circulates in the roadway 2 so as to form a loop, the extension of which along the axis X corresponds to that of the segment 11.*i* that is associated with it.

For example and preferably, the antenna 52.*i* circulates in longitudinal channels provided in each of the lateral edges of the carrier profile 25 of the phase track 11.

Due to its geometry and its implementation in the middle of the travel path, the antenna chart of a ground level antenna 52.*i* is uniform along the axis X and symmetrical relative to the plane XZ. Thus, the measurement of the magnetic flux in a plane parallel to the plane XY is essentially a function of the lateral position along the axis Y.

The ground level transceiver device 50.*i* is connected to a ground level computer 53.*i*. This computer is in particular connected to the switch 30.*i* to command the opening or closing thereof. The ground level computer 53.*i* is also connected by an appropriate network to the other computers 53.*j* so as to exchange information.

The car 1 includes a body 4 and wheels 3.

A trihedron X'Y'Z' is traditionally associated with the car 1: the axis X' in the longitudinal direction, oriented toward the front; the axis Y' in the transverse direction, oriented from left to right; and the axis Z' orthogonal to the axis X' and the axis Y'. When the car 1 travels on the roadway 2, the axis Z' substantially coincides with the axis Z.

The front wheels 3*a* and 3*b* are for example guide wheels. They are coupled to a steering system 110 making it possible to change the angle of the wheels to drive the car 1.

The rear wheels 3*c* and 3*d* are for example drive wheels. They are coupled to an electric motor 120 in order to propel the car 1.

The car 1 includes a rechargeable battery 130 able to apply an appropriate electrical power to the electric motor 120.

The car 1 includes a braking system including brakes 5*a* to 5*d* on each of the wheels 3 and a device for actuating the brakes 140 to slow the car 1.

The car 1 includes an on board computer 150 able to pilot the car 1, if the car 1 is driverless, or able to offer driving assistance when the vehicle equipped with the on board computer is piloted. To that end, the on board computer 150 acquires a plurality of input data, executes appropriate computer programs, using this input data to generate output commands applied to the steering system, the braking system, the engine, the battery, etc., to pilot the car 1.

The car 1 is equipped with a capture device 160 making it possible to collect electric power from the ground level power supply system 10, during the movement of the car 1.

It includes a shoe 162 able, in one simple embodiment, to be moved along the axis Z' relative to the body 4 of the car 1 to be lowered and kept in sliding contact on the power supply tracks of the system 10. The capture device 160 includes an actuator 164 for the movement of the shoe 162.

The capture device 160 is coupled to the battery 130 and the motor 120 by appropriate adaptation means 166, to apply the collected electric power to the battery and/or the electric motor.

In the embodiment of the figures, the shoe is placed at the rear of the vehicle 1.

The car 1 includes an on board transceiver device 170 including a transceiver module 175 preferably connected to two on board antennas 171 and 172.

The antennas are intended to capture an electromagnetic positioning signal emitted by the ground level antenna 52.*i* or to send an electromagnetic presence signal to the ground level antenna 52.*i*, when the car 1 is over the segment 11.*i*.

The two on board antennas 171 and 172 are mounted on the car 1 so as to be separated from one another at least longitudinally, i.e., along the axis X'. Preferably, one of the antennas is carried by the shoe 162 of the capture device 160. This is therefore the rear antenna 172 for the embodiment shown in the figures. An on board antenna placed on the shoe has the advantage of increasing the detection sensitivity of the positioning signal emitted from the ground and vice versa, the distance between these two antennas being small.

The front 171 and rear 172 on board antennas are able to allow a precise determination of the relative position of their center, C1 and C2 respectively, relative to the axis X of the ground level antenna 52.*i*. For example, an on board antenna is made up of several turns. It is preferably mounted on the car 1 such that its geometric center is arranged on the axis X'.

From the analysis of the instantaneous magnetic fluxes through each antenna, the transceiver module 175 is able to determine, at each moment and with great precision, the lateral position of the center of the on board antenna relative to the axis X of the ground level antenna, and consequently the position of the vehicle relative to the axis X of the roadway.

The transceiver module 175 is connected to the on board computer 150 and sends it these relative positions of the centers of the on board antennas as input data for piloting the car 1, in particular lateral guiding of the car 1.

In communication from the ground toward on board, the ground level transceiver device 50.*i* operates in transmission and the on board transceiver device 170 operates in reception.

More specifically, the ground level device 50.*i* emits a positioning signal, which is a continuous radio signal for example having a characteristic frequency of 38 kHz.

The signal collected by each of the front 171 and rear 172 antennas is applied as input for the on board transceiver module 175. The latter determines the instantaneous lateral position of the center C1 and C2 of each on board antenna 171 and 172 relative to the axis X. The module 175 sends these instantaneous lateral positions to the on board computer 150 such that it determines, in light of the deviation between the two on board antennas, the position of the axis X' of the vehicle relative to the axis X of the road. The on board computer 150 is in particular able to command the steering means 110 so as to have the axis X' and the axis X coincide at each moment, i.e., at each moment, the geometric center of each antenna is located above the axis X.

In communication from on board toward the ground, the on board transceiver device 170 operates in transmission and the ground level transceiver device 50.*i* operates in reception.

More specifically, the on board transceiver module 175 is able to apply, to at least one of the two on board antennas 171 or 172, a presence signal such that this on board antenna emits a continuous radio signal for example having a characteristic frequency of 483 kHz.

Preferably, the on board antenna chosen to emit the presence signal is the rear antenna 172.

The signal collected by the ground level antenna 52.*i* is applied as input for the ground level transceiver module 51.*i*. When a presence signal is actually captured by the ground level transceiver device 50.*i*, the module 51.*i* sends the computer 53.*i* a message indicating the presence of a vehicle over the corresponding segment 11.*i*. When the car 1 is detected, the computer 53.*i* commands the closing of the switch 30.*i* such that the segment 11.*i* of the phase track 11 is brought to the power supply potential Vs. The shoe of the car 1 can then capture an electric power from the system 10.

When no presence signal is captured by the ground level transceiver device 50.*i*, the module 51.*i* does not send any message to the computer 53.*i*, which keeps the switch 30.*i* open such that the segment 11.*i* of the phase track 11 is brought to the potential of 0 V.

Many alternatives can be considered by one skilled in the art.

Thus, in the embodiment described in detail above, the on board and ground level devices work both in reception and transmission to perform both the positioning function of the vehicle on the roadway and the detection function of the presence of a vehicle to bring the segment above which the vehicle is located to the power supply potential. However, two different means can be used: on the one hand, a ground level antenna dedicated to emitting a positioning signal and an on board receiving antenna for the positioning of the vehicle relative to the axis of the roadway; on the other hand, an on board antenna emitting a presence signal and a ground level device for receiving this presence signal for detecting the presence of the vehicle and supplying power for the corresponding segment of the track.

Alternatively, the ground level antenna 52.*i* circulates in longitudinal channels provided in each of the lateral edges of the carrier profile 26 of the neutral track 12 or around a portion of the protective track 13, or freely on the first side between the phase track 11 and the neutral track or on the second side between the phase track 11 and the protective track 13. The lateral offset between the axis of the antenna and the axis of the roadway must then be known by the on board computer to determine the lateral position of the vehicle relative to the axis of the roadway.

Alternatively, the on board device includes only a single antenna for the lateral positioning function. However, with a single lateral position, one loses the redundancy and the extra location precision provided by the second antenna. This is the advantage of using two longitudinally separated on board antennas.

Alternatively, the shoe was movable not only vertically, but also horizontally relative to the body of the vehicle. Thus, if an on board antenna is mounted on the shoe, the on board computer must correct the measurement of the lateral position of the center of this on board antenna with the instantaneous position of the shoe relative to the body of the vehicle, before determining the lateral position of the vehicle with respect to the axis of the path on which the vehicle is traveling.

The invention claimed is:

1. An assembly made up of a ground level power supply system and an electric vehicle, the ground level power supply system being of the type using conduction and including conductive tracks arranged in a roadway and the electric vehicle being capable of capturing electric energy from said conductive tracks while said electric vehicle is moving on the roadway, characterized in that the ground level power supply system comprises:
a ground level device including a ground level antenna buried in the roadway, configured so as to have a substantially constant radiation chart along a longitudinal axis of the roadway and capable of emitting a positioning signal, wherein the electric vehicle comprises:
an on board device including an on board antenna and an on board transceiver module, which is connected to the on board antenna and is capable of determining a lateral position of a center of the on board antenna relative to the longitudinal axis of the roadway from the positioning signal captured by the on board antenna, the on board transceiver module being connected to an onboard computer of the electric vehicle and sending said lateral position to said onboard computer, said on board computer using said lateral position as input data to drive the electric vehicle,
wherein the ground level power supply system further comprises:
a pair of power supply tracks including a so-called phase conductive track, able to be brought to a supply voltage, and a so-called neutral conductive track, for the reverse current, the neutral track traveling parallel to the phase track and the phase track being made up of a plurality of segments arranged end-to-end along the longitudinal axis of the roadway, each segment being electrically insulated from its neighbors; and
a voltage source capable of delivering the supply voltage.

2. The assembly according to claim 1, wherein the electric vehicle further comprises a current capture device including a shoe capable of coming into sliding contact on the conductive tracks of the ground level power supply system.

3. The assembly according to claim 2, wherein the on board antenna of the on board device is mounted on the shoe.

4. The assembly according to claim 1, wherein the on board device includes a front on board antenna, mounted at the front of the electric vehicle, and a rear on board antenna, mounted at the rear of the electric vehicle, the on board module being capable of determining the lateral position of the geometric center of each of the front and rear on board antennas relative to the longitudinal axis of the roadway and sending said lateral positions to the on board computer to determine the position of the longitudinal axis of the electric vehicle relative to the longitudinal axis of the roadway.

5. The assembly according to claim 1, wherein the positioning signal is a continuous radio signal.

6. The assembly according to claim 1, wherein the electric vehicle further comprises an on board device for emitting a presence signal and the ground level power supply system further comprises a ground level device for receiving the presence signal.

7. The assembly according to claim 6, wherein the on board device is a transceiver device capable of participating both in a lateral positioning function by receiving a location signal emitted from the ground, and a function for detecting the presence of a vehicle by emitting a presence signal toward the ground.

8. The assembly according to claim 6, wherein the ground level device is a transceiver device capable of participating both in a lateral positioning function by emitting a location signal intended for on board, and a presence detection function by detecting a suitable presence signal emitted from on board.

9. The assembly according to any one of claim 1, wherein the electric vehicle is of the driverless type, an on board computer steering the electric vehicle, or of the type with a driver, an on board computer offering driving assistance for the electric vehicle.

* * * * *